(12) United States Patent
Benoit

(10) Patent No.: US 11,084,757 B2
(45) Date of Patent: Aug. 10, 2021

(54) ASPHALT COMPOSITION AND METHOD OF PRODUCTION AND/OR REGENERATION OF AT LEAST ONE ASPHALT SURFACE LAYER

(71) Applicant: Harald Heinz Peter Benoit, Zweibruecken (DE)

(72) Inventor: Harald Heinz Peter Benoit, Zweibruecken (DE)

( * ) Notice: Subject to any disclaimer, the term of this patent is extended or adjusted under 35 U.S.C. 154(b) by 317 days.

(21) Appl. No.: 15/578,900

(22) PCT Filed: May 25, 2016

(86) PCT No.: PCT/EP2016/061752
§ 371 (c)(1),
(2) Date: Dec. 1, 2017

(87) PCT Pub. No.: WO2016/193082
PCT Pub. Date: Dec. 8, 2016

(65) Prior Publication Data
US 2018/0170807 A1 Jun. 21, 2018

(30) Foreign Application Priority Data
Jun. 3, 2015 (DE) .................... 10 2015 108 862.2

(51) Int. Cl.
| | | |
|---|---|---|
| C04B 26/26 | (2006.01) | |
| C08L 95/00 | (2006.01) | |
| C08K 3/34 | (2006.01) | |
| C04B 14/32 | (2006.01) | |
| E01C 7/18 | (2006.01) | |
| E01C 7/26 | (2006.01) | |
| E01C 7/30 | (2006.01) | |
| E01C 11/00 | (2006.01) | |
| E01C 23/06 | (2006.01) | |
| E01C 23/14 | (2006.01) | |
| C08K 9/08 | (2006.01) | |
| C08K 3/14 | (2006.01) | |
| C04B 111/00 | (2006.01) | |

(52) U.S. Cl.
CPC .......... *C04B 26/26* (2013.01); *C04B 14/324* (2013.01); *C08K 3/34* (2013.01); *C08L 95/00* (2013.01); *E01C 7/187* (2013.01); *E01C 7/26* (2013.01); *E01C 7/30* (2013.01); *E01C 11/005* (2013.01); *E01C 23/065* (2013.01); *E01C 23/14* (2013.01); *C04B 2111/0075* (2013.01); *C08K 3/14* (2013.01); *C08K 9/08* (2013.01); *C08L 2555/22* (2013.01); *C08L 2555/30* (2013.01); *C08L 2555/34* (2013.01); *C08L 2555/40* (2013.01)

(58) Field of Classification Search
CPC .... C08L 95/00; C08L 95/005; C08L 2555/30; C08L 2555/34; C08L 2555/40; C09D 195/00; C09D 195/005; C10C 3/00; E01C 7/18; E01C 7/187; E01C 7/26; E01C 7/30; E01C 7/06; E01C 11/00; E01C 11/005; E01C 23/065; E01C 23/14; E01C 23/00; E01C 23/04; E01C 3/00; C04B 26/26; C08K 3/34
See application file for complete search history.

(56) References Cited

U.S. PATENT DOCUMENTS

| | | | |
|---|---|---|---|
| 4,175,885 A | 11/1979 | Jeppson | |
| 4,237,152 A * | 12/1980 | Loricchio | E01C 7/356 |
| | | | 106/14.33 |
| 4,252,459 A | 2/1981 | Jeppson | |
| 4,252,487 A | 2/1981 | Jeppson | |
| 4,319,856 A | 3/1982 | Jeppson | |
| 4,594,022 A | 6/1986 | Jeppson | |
| 4,849,020 A | 7/1989 | Osborne et al. | |
| 5,092,706 A * | 3/1992 | Bowen | E01C 23/06 |
| | | | 404/31 |
| 5,441,360 A | 8/1995 | Long et al. | |
| 7,588,388 B2 * | 9/2009 | Hall | E01C 19/176 |
| | | | 404/101 |
| 7,993,442 B2 * | 8/2011 | Crews | C08L 95/005 |
| | | | 106/277 |
| 8,753,035 B2 * | 6/2014 | Wang | C04B 26/26 |
| | | | 404/31 |

FOREIGN PATENT DOCUMENTS

| | | | |
|---|---|---|---|
| CN | 101235208 A | * | 8/2008 |
| CN | 101235208 A | | 8/2008 |
| CN | 101736671 A | * | 6/2010 |
| CN | 101736671 A | | 6/2010 |
| CN | 101906745 A | * | 12/2010 |
| CN | 101906745 A | | 12/2010 |
| CN | 103435293 A | * | 12/2013 |
| CN | 103435293 A | | 12/2013 |

OTHER PUBLICATIONS

CN 103435293 Espacenet Machine Translation (Year: 2019).*
Netafim Mesh vs Micron Comparison Chart (Year: 2017).*
Espacenet Machine Translation of CN 103435293 A (Year: 2020).*
Espacenet Machine Translation of CN 101906745 A (Year: 2020).*
Espacenet Machine Translation of CN 101736671 A (Year: 2020).*
CN 101235208 A Machine Translation. Foreign Patent Finder Tool; Proquest Dialog. (Year: 2020).*

(Continued)

*Primary Examiner* — Alexander M Moore
(74) *Attorney, Agent, or Firm* — Ditthavong, Steiner & Mlotkowski

(57) ABSTRACT

The present invention relates to an asphalt composition comprising asphalt or an asphalt mixture and to a silicon carbide-containing binder that can be heated by means of microwaves. The silicon carbide is present in the binder in particle form, the equivalent diameter of silicon carbide particles contained in the binder is less than 60 μm. The invention also relates to a method for producing and/or renovating road surfaces or asphalt surfaces comprising at least one asphalt surface layer.

1 Claim, No Drawings

(56) References Cited

OTHER PUBLICATIONS

International Search Report; PCT/EP2016/061752; dated Nov. 4, 2016.
Written Opinion of the International Search Authority; PCT/EP2016/061752; dated Nov. 4, 2016.
International Preliminary Report on Patentability; PCT/EP2016/061752; dated May 19, 2017.

* cited by examiner

ASPHALT COMPOSITION AND METHOD OF PRODUCTION AND/OR REGENERATION OF AT LEAST ONE ASPHALT SURFACE LAYER

TECHNICAL FIELD

The present invention relates to an asphalt composition and a method for the production and/or regeneration of at least one asphalt surface layer.

STATE OF THE ART

The production of asphalt from a mixture of various aggregates such as rocks, splinters, sand and a binder such as bitumen is known. To this purpose, the asphalt material is heated at high temperatures and, for example, directly during road construction or processed at the repair site. When repairing damaged asphalt covers, for example, outbreaks of roads the asphalt material is directly heated by a gas or induction heater to keep the material viscous and thus to facilitate its processing. Further, methods are known, in which the asphalt material is heated with microwaves, for example, as described in U.S. Pat. No. 4,594,022 or 4,319,856, 4,175,885, 4,252,459 and 4,252,487. In these methods, a foil is used, which should reflect the incoming microwaves, so as to facilitate heating of the material. A disadvantage of this method is that the penetration depth of the microwaves in the material is low. U.S. Pat. Nos. 5,441,360 A, 5,092,706 A, 4,849,020 A disclose that a microwave radiation absorbing material during recycling of an asphalt surface layer is brought into use. Further, the methods described therein show, as to how a lining of potholes in asphalt surfacing with a microwave-absorbing material and a subsequent heating of the pothole to be repaired is run by means of microwave radiation.

Similar methods and compositions are also described in CN 101736671 A and CN 101906745 A, whose asphalt mixtures additionally contain a number of other components, including magnetic powder, iron powder, basalt and silicon carbide. For instance, CN 101736671 A describes a composition of an asphalt mixture for surface layers, which can be heated by microwave radiation (0.9 to 6 GHz) and contains between 4 and 40 wt.-% of sand-like silicon carbide. Silicon carbide has the property of absorbing microwaves, and delivering it to the environment in the form of heat energy.

CN 101906745 A discloses an asphalt mixture for surface layers, which can be heated by microwave radiation and contains a mineral powder, whereby the mineral powder contains 10 to 100 wt.-% of a microwave absorbing material and the microwave absorbing material can be silicon carbide.

CN 101235208 A discloses a composition of asphalt based on a binder, preferably bitumen, which is heated during further processing through microwave radiation and which contains 1.4 to 2.1% of silicon carbide in the form of needle-shaped crystals. Bituminous compositions can thereby be used as starting material for the production of roads.

CN 103435293 A discloses a heat-conducting asphalt concrete that includes 0.2 up to 5 parts of 100 parts silicon carbide-containing micro-powds. The average particle size of silicon carbide particle shall not be more than 200 mesh.

The disadvantage of previously known asphalt mixtures as well as the methods for their processing is that it necessarily occurs while applying the asphalt mixtures or when filling eruptions of a drivable top layer, resulting in trapping of air in the asphalt mixtures. Due to the heterogeneous particle size distribution within the asphalt mixture it creates cavities, which prevent heat transfer mediated by silicon carbide or at least complicate this process.

DISCLOSURE OF THE INVENTION

It is, therefore, an object of the present invention to provide an asphalt mixture, and a method, in which the heat transfer is optimized during microwave application to the binder in the asphalt mixture, and the disadvantages, as known from prior art, are eliminated at least partially.

According to the invention, this object is achieved by an asphalt composition according to claim 1 and a method for the production and/or regeneration of at least one asphalt surface layer according to claim 7.

BEST MODE FOR CARRYING OUT THE INVENTION AND INDUSTRIAL APPLICABILITY

The asphalt composition of the invention comprises in addition to asphalt or an asphalt mixture, a silicon carbide-containing binder that can be heated by microwave radiation, wherein the said silicon carbide is present in the binder in particle form, and the equivalent diameter of the silicon carbide particles contained in the binder is less than 60 μm.

Preferably, the silicon-carbide containing binder is bitumen. Further, inorganic compounds such as mineral and/or ceramic heat-conducting fillers may be utilized in the binder. In addition, organic or synthetic binders are comprises, for example, proteins (e.g. casein or gluten), carbohydrates (such as starch or cellulose), resins (e.g. epoxy resins or amino resins), natural compounds/natural resins (such as tannins or lignin). Alternatively or additionally, plastics such as thermosets (e.g. melamine, formaldehyde glue, urea-formaldehyde glue), thermoplastics (such as plastic powder or plastic dispersions of PVC, PP, acrylates or polyvinyl acetate (PVAc)) or glue, hot-melt adhesive or silicones in the composition can be included. Possible solvents for the binders are, for example, various hydrocarbon compounds, oils, greases or water. Further, it is possible to use chemical cross-linkers such as monomers or bitumen-activator. Heat-transferring materials can also be admixed with the binder, in particular heat-conducting oil or thermal conductance pastes. In addition, microwave-reflecting materials may be present, for example, in metals, metal oxides or graphite in the form of flakes, powders, fibres or fabrics in the binder. Also included are mixtures of the abovementioned substances. The admixtures can be carried out in liquid, paste, dispersed or solid form. Preferably, the composition of the invention comprises bitumen as silicon-carbide containing binder and/or one or more substances selected from the group consisting of petroleum derivatives, oils, greases, tars, natural products, natural resins, carbohydrates, proteins, natural glues, adhesives, hot melt adhesives, wood glues, tannins, lignins, silicones, synthetic resins, epoxies, plastics, thermosets, thermoplastics, monomers and liquid silicon-carbide containing entry aids, water, alcohol for distribution of silicon carbide in the asphalt mixture.

In an advantageous embodiment, the silicon carbide particles are dispersed in the binder. For this purpose, the silicon carbide particles are preferably already at least partially coated with a binder, whereby an increase in the dispersibility is achieved. Furthermore, the coating significantly improves the heat transfer from the silicon carbide particles to the binder contained in the mixture.

Preference is given to a mass fraction of up to 30 wt.-% of silicon carbide, based on the asphalt composition, dispersed in the binder, preferably up to 10 wt.-%, preferably up to 5 wt.-%, preferably up to 2 wt.-%. Particularly preferred, the mass fraction of silicon carbide, based on the asphalt composition, in the binder lies between 0.5 wt.-% to 30 wt.-%, preferably between 5 wt.-% to 20 wt.-%. Depending on the nature and structure of the asphalt composition, even concentrations of the silicon carbide particles, based on the asphalt composition, are possible to be less than 0.5 wt.-%.

In a further embodiment, only silicon carbide particles are dispersed within the binder, which has an equivalent diameter of less than 60 µm, depending on the requirement, even less than 50 µm, 40 µm, 30 µm, 20 µm, 10 µm, 5 µm, 0.1 µm, 0.01 µm or 0.001 µm. Preferred equivalent diameters lie in a range between 25 nm and 60 µm. Particularly preferred are mixtures binders, which comprise silicon carbide with an equivalent diameter of between 25 nm and 1 µm, 50 nm and 0.5 µm, 3 µm and 25 µm, or between 1 µm and 20 µm, or between 20 µm and 30 µm, or between 30 µm and 40 µm, or between 40 and 50 µm, or between 50 µm and 60 µm. The finer the grain size distribution of silicon carbide particles, the more effective is the energy transfer.

Particularly preferred are binders with silicon carbide particles, in which the particle size distribution is homogeneous. By this is meant that a medium equivalent diameter of 25 nm, 50 nm, 100 nm, 500 nm, 1 µm, 5 µm, 10 µm, 15 µm, 20 µm, 25 µm, 30 µm, 35 µm, 40 µm, 45 µm, 50 µm, 55 µm or 60 µm only each of ±10%, preferably deviates only by ±5%.

In a preferred variant, the silicon carbide is present in powder form, wherein the particle size of the silicon carbide particles contained therein is <60 µm. In this variant, an interspersion of silicon carbide is possible directly into the asphalt mixture. Alternatively, the silicon carbide can be applied to the milled but not yet coated surface layer. It serves as a heat exchanger in the link layer in the preparation of a new road surface.

The inventive fine particle distribution and the small grain sizes of silicon carbide particle used in the mixture have the advantage that an optimized heat transfer occurs during the treatment of the asphalt mixture with microwaves, which is caused by the significantly reduced voids between the aggregates and/or silicon carbide particles. The individual silicon carbide particles are deposited directly between aggregates. Hereby, a quick and efficient energy transfer can take place directly onto the binder, which is energetically more favourable than heating of aggregates. The energy absorbed by the silicon carbide particles will thus be almost entirely passed onto the environment, which upon reaching their melting temperature, softening or sintering temperature leads to a melting or plastic workability of the asphalt binder.

A preferred asphalt composition may comprise, in addition to an asphalt binder, asphalt concrete, a Split Mastic Asphalt (SMA), sheet asphalt, asphalt mastic, asphalt-based surface layer or open porous asphalt and also mechanically removed portions of asphalt surface layer. The asphalt composition according to the invention is particularly suitable for the production of asphaltic road surfaces or their renewal.

The invention further relates to a method for the production and/or regeneration of at least one surface layer comprising asphalt surface or road surface.

In the method according to the invention, asphalt or asphalt mixture with a viscous silicon-carbide containing binders is used and is brought into contact with the asphalt or asphalt mixture and then treated with microwaves. Thanks to the treatment with microwaves, energy is introduced directly to the binder, leading to heat generation on the silicon carbide particles. Bringing the binder into contact with asphalt or an asphalt mixture or an asphalt surface can take place by means of pouring and/or interspersing and/or spraying.

In a first embodiment, for the purpose of producing or restoring an asphalt surface layer, a granulate is produced according to the invention from the mechanically removed portions of an asphalt surface layer. The removal can, for example, take place through a milling of an asphalt surface. In a subsequent step, the recovered granulate is crushed to a grain size having an equivalent diameter of between >0 mm and 60 mm, preferably between 0.01 mm and 60 mm, preferably between 0.01 mm and 25 mm, preferably between 0.05 mm 5 mm, whereby the grain size depends on the respective asphalt composition. Preferred are, for example, grain sizes of between 1 mm and 35 mm. A homogeneous grain size distribution of granulate is desired. The granulate thus produced, is preferably mixed or sprayed with a viscous silicon-carbide containing binder having the composition according to the invention described above.

Subsequently, the granules mixed with silicon-carbide containing binder are compacted and treated with microwaves. If necessary, additional external energy can be introduced, for example, via a gas burner. By the introduction of microwaves into the coated granulate and the associated heating of the granulate, a further compaction of the material can be achieved during the application. The microwave treatment can be carried out either after applying the asphalt mixture on a surface and subsequent compression, or during the application. Preferably, during application, microwaves with a frequency between 300 MHz and 300 GHz are used. Preferably, microwaves are used in a frequency range between 0.5 to 25 GHz, preferably between 0.5 and 10 GHz.

This method has a special significance in the repair of asphalt surface with at least one outbreak (pothole) developed therein. In this regard, first a viscous silicon-containing asphalt composition of the invention is introduced into the outbreak. This is followed by a compaction of the asphalt composition within the outbreak and the introduction of microwaves into the outbreak.

It is particularly preferred when the surface of the outbreak is bedewed prior to the introduction of the viscous silicon-carbide containing asphalt composition with the viscous silicon-carbide containing binder. The binder can, for this purpose, contain silicon-carbide particles in a different grain size distribution, than the silicon carbide particles in the asphalt composition. Preferably, the binder contains silicon carbide particles having an equivalent diameter in a range between 1 nm and 60 µm, preferably between 25 nm and 20 µm, preferably between 50 nm and 10 µm.

In an application example, the method according to the invention is used for producing and/or renewal of asphalt pavements or road surface, comprising a surface layer, an asphalt binder layer and a base layer.

Usually, a road includes a base layer, a surface layer and an asphalt binder layer lying in between. The asphalt binder layer is arranged below the surface layer and above the base layer. The asphalt binder layer, the surface layer and the base layer are each joined together integrally. The surface layer and/or asphalt binder layer can also include asphalt- and/or concrete- and/or cement-containing components.

For performing the method, at least a part of the surface layer is mechanically removed first, whereby a granulate is obtained from the removed surface layer. The granulate thus obtained is then subsequently crushed such until the desired average grain size with an equivalent diameter is present up to 60 mm. Also, mineral and/or synthetic polymers with a weight fraction of up to 40 wt.-%, preferably 0.5 wt.-% to 40 wt.-%, in particular between 5 wt.-% and 30 wt.-%, especially between 10 wt.-% and 20 wt.-%, particularly between 12.5 wt.-% and 17.5 wt.-%, can be added to the removed surface layer. Just as, the asphalt mixture may also include concrete- or cement-containing granulate. The granulate so produced, which has been previously mixed with the silicon-carbide containing binder or blended and/or sprayed, can be applied onto a surface to be coated now.

It is especially preferred when the surface to be coated is bedewed beforehand with the silicon-carbide containing binder. In effect, this causes an improved adhesion of the granulate produced. Subsequently, the coated granulate is treated with microwaves and compacted. In this way, energy input acting on the particle surroundings results in the generation of heat in the binder, whereby the viscosity of the asphalt composition is lowered. In addition, the compacting ability of the asphalt composition is increased.

The invention claimed is:

1. A method for production and/or regeneration of at least one asphalt surface layer comprising asphalt pavements or road surfaces, wherein the asphalt surface layer has at least one outbreak formed therein, the method consisting of the following steps:
    a) an asphalt or asphalt mixture is brought into contact with a viscous silicon-carbide containing binder, wherein the silicon carbide is present in the binder in particle form, wherein the equivalent diameter of the silicon carbide particles contained in the binder is less than 60 μm and then treated with microwaves forming a viscous silicon-carbide containing asphalt composition, whereby energy input with heat development takes place that directly acts on the binder via the silicon carbide particles
    b) bedewing the outbreak with the viscous silicon-carbide containing binder,
    c) introducing the viscous silicon-carbide containing asphalt composition in the outbreak,
    d) compacting the asphalt composition inside the outbreak, and
    e) introducing microwaves into the outbreak.

* * * * *